United States Patent [19]

Gruber

[11] 3,721,971
[45] March 20, 1973

[54] MATERIAL LEVEL INDICATOR FOR BINS OR OTHER RECEPTACLES

[75] Inventor: George E. Gruber, Port Sanilac, Mich.

[73] Assignee: Monitor Mfg., Inc., Minden City, Mich.

[22] Filed: March 22, 1971

[21] Appl. No.: 126,446

[52] U.S. Cl. ..................................340/246, 74/86
[51] Int. Cl. .............................................G08b 23/00
[58] Field of Search.......................................340/246

[56] References Cited

UNITED STATES PATENTS

| 2,836,038 | 5/1958 | Morgan | 340/246 |
| 2,851,553 | 9/1958 | Grostick | 340/246 |
| 3,210,495 | 10/1965 | Lau | 340/246 |

Primary Examiner—Thomas B. Habecker
Attorney—Burmeister, Palmatier & Hamby

[57] ABSTRACT

The indicator comprises a motor-driven probe which is oscillated or otherwise moved relative to the material in a bin or other receptacle. The motor rotates a first gear, while the probe is operated by a mechanism driven by a second gear. An intermediate gear meshes with the first and second gears and is mounted on a swingable carriage pivoted about the axis of one of the other gears. When the probe engages the rising material, the movement of the probe is impeded. The resulting torque reaction causes swinging movement of the carriage against the biasing force of a spring. The carriage thereby operates a switch which can be employed to actuate an alarm, stop the motor, stop the flow of material into the bin, or perform other control functions. The probe is swingably supported by a flexible diaphragm which also acts as a seal.

10 Claims, 6 Drawing Figures

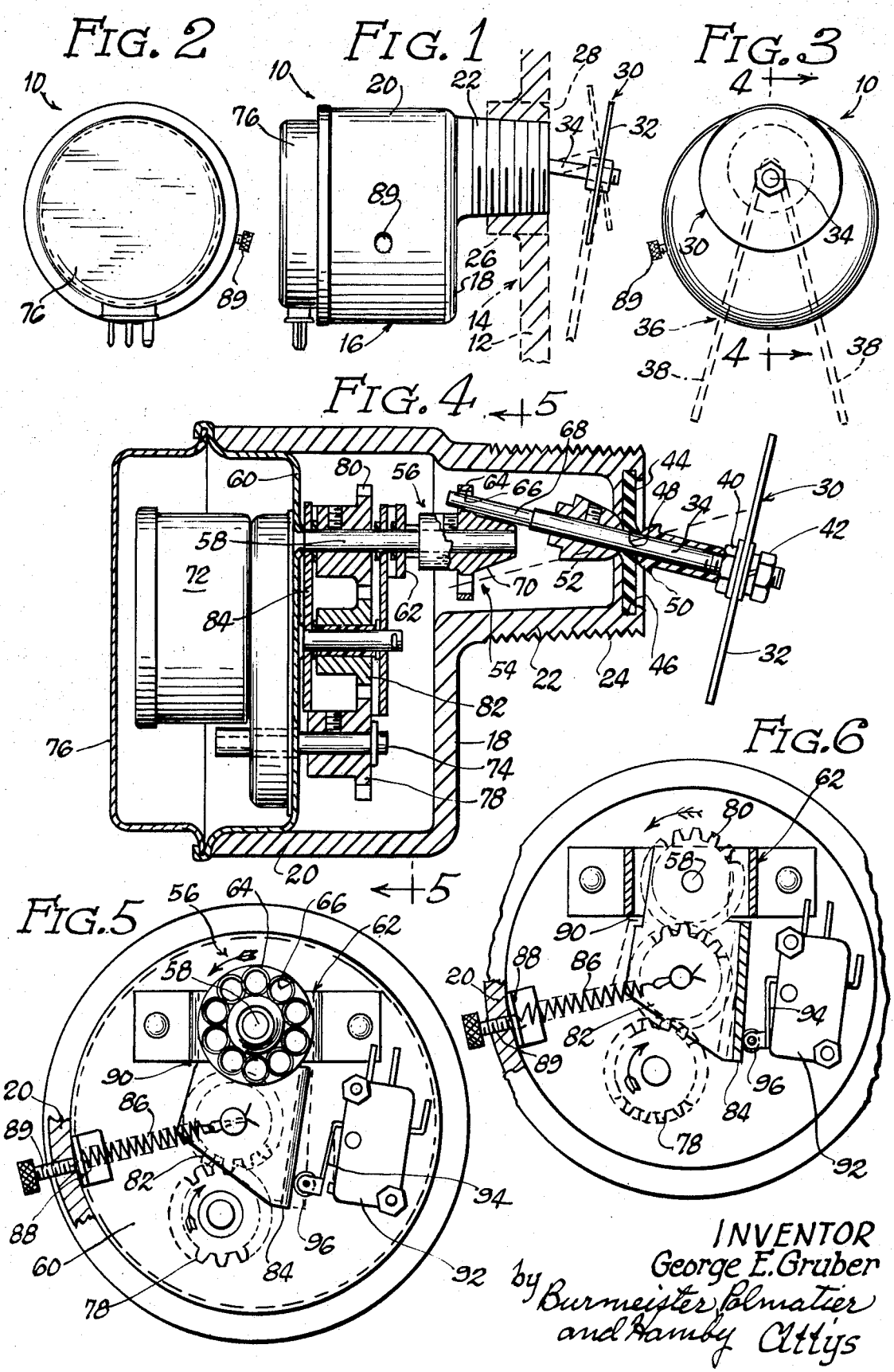

MATERIAL LEVEL INDICATOR FOR BINS OR OTHER RECEPTACLES

This invention relates to devices for indicating the level of materials of various kinds in bins or other receptacles. Most commonly, such materials are granular or finely divided in character, but such level indicating devices are applicable to a wide variety of materials.

Such indicating devices are needed to show when a bin or other receptacle has been filled to the desired level. The indicator can be arranged to sound an alarm or stop the conveyor or other device which is being employed to deliver the granular material to the bin. Other control functions may also be carried out by such level indicating devices. Thus, for example, a level indicating device can be employed to perform a control function when the material falls below a predetermined level in a bin or the like.

In the prior art, one common type of level indicating device has utilized a rotary probe or member having one or more paddles adapted to engage the material in the bin when it rises to a predetermined level. The paddle member is driven by an electric motor. When the paddle member engages the material, the torque developed by the motor is substantially increased and eventually the motor is stalled due to excessive torque. The motor is movably mounted so that it is moved bodily by the torque reaction on the motor when it is stalled. Such movement of the motor is employed to operate a switch, which is arranged to energize an alarm or perform other control functions. In many instances, the switch deenergizes the motor.

It has been found that the mounting of the motor for bodily movement often leads to a situation in which the indicator tends to be sluggish and insensitive. Moreover, the construction tends to be more expensive then would be desirable. The rotary paddle member must be supported by bearings which have to be protected from entry of the granular material from the bin.

It is one object of the present invention to provide a bin level indicator which is highly sensitive and quick acting, yet is remarkably low in cost.

A further object is to provide such an indicator in which the entire mechanism is sealed against entry of the granular material from the bin.

Thus, the indicator of the present invention preferably comprises a probe which is supported by a flexible member such as a rubber diaphragm or the like which acts as a seal so as to prevent the entry of the granular material or any foreign particles into the housing of the indicator. The probe is preferably arranged to be oscillated or swung rather than being rotated, so that the probe can be tightly sealed into the flexible supporting member. Such supporting member is sufficiently flexible to provide for the oscillatory swinging movement of the probe. The motive power for oscillating the probe is provided by a motor mounted within the housing of the indicator.

Three gears or other rotary driving members are employed between the motor and the probe. One gear is mounted on the output shaft of the motor, while another gear is mounted on the rotary shaft which operates the mechanism for oscillating the probe. An intermediate gear meshes with the other two gears and forms a driving connection therebetween. The intermediate gear is mounted on a swingable carriage which preferably is pivoted about the axis of the second gear.

When the oscillating probe engages the material in the bin, the movement of the probe is impeded or actually stopped. As a result, the gears transmit increased torque which reacts upon the intermediate gear so as to move the swingable carriage against the resistance provided by a biasing spring or the like. The movement of the carriage operates a switch which may be employed to stop the motor, energize an alarm, and perform other control functions. When the material drops away from the probe, the torque on the gears is relieved, whereupon the spring returns the carriage to its initial position. The switch is thus deactuated.

Further objects, advantages and features of the present invention will appear from the following description, taken with the accompanying drawings, in which:

FIG. 1 is a general side elevation of a bin level indicator to be described as an illustrative embodiment of the present invention.

FIG. 2 is an end view of the indicator as viewed from outside the bin.

FIG. 3 is an end view showing the opposite end of the indicator.

FIG. 4 is an enlarged longitudinal section taken generally along the line 4—4 in FIG. 3.

FIG. 5 is an end elevation of the mechanism within the indicator, the housing being removed for clarity of illustration.

FIG. 6 is a view similar to FIG. 5 but showing the manner in which the swingable carriage actuates the control switch.

As just indicated, the drawings illustrate a level indicator 10 adapted to be mounted on a wall 12 of a bin or other receptacle 14. The indicator 10 comprises a housing 16 which may be of any suitable construction, but is illustrated as being generally cup-shaped with an end wall 18 and a cylindrical side wall 20. A tubular mounting member 22 projects from the end wall 18. In the illustrated construction, external pipe threads 24 are formed on the mounting portion 22 so that it may be screwed into a mounting bushing 26 on the bin wall 12. The bushing 26 may take the form of one-half of a conventional pipe coupling welded into or around an opening 28 in the bin wall 12.

The indicator 10 utilizes a probe or feeler 30 which extends into the bin 14 and is adapted to engage the granular or other material in the bin if it rises to the level of the probe. In this case, the probe 30 comprises a member 32 mounted on a shaft or rod 34. The member 32 may assume various forms, such as the illustrated disc or plate. FIG. 3 illustrates another type of member in the form of a piece of wire 36 bent into a generally V-shaped form so as to have a pair of arms 38 adapted to engage the material in the bin. Members of various kinds can be used for different materials. As shown, the end of the rod 34 is threaded so that the member 32 can be removably clamped between nuts 40 and 42.

The supporting rod or shaft 34 of the probe is preferably supported by a flexible member 44 which may assume various forms but is illustrated as a diaphragm made of natural or synthetic rubber or some other suitable material. The diaphragm 44 also forms a seal to close the end of the tubular mounting member 22. As shown, the diaphragm 44 is retained in an internal groove 46 formed in the tubular member 22.

Preferably, the rod 34 is vulcanized or otherwise fixedly secured into an opening 48 in the flexible diaphragm 44. Members 50 and 52 may be mounted on the rod 34 on opposite sides of the diaphragm 44 to engage the diaphragm 44 so as to obviate any possibility that the rod 34 will be pulled free from the diaphragm.

It will be evident that the diaphragm 44 supports the probe 30 for swinging movement in any direction. The indicator 10 preferably includes means for continuously oscillating the probe 30 when the material is below the level of the probe in the bin 14. A mechanism 54 is provided for oscillating the probe. Such mechanism 54 may assume various forms but is illustrated as comprising a rotary member 56 including a rotatable supporting shaft 58. It will be seen that the shaft 58 is supported for rotation by suitable means, illustrated as comprising a cup-shaped mounting member 60 and a bracket 62 mounted thereon.

The rotary shaft 58 carries an operating member 64 illustrated in the form of a disc having at least one opening 66 therein adapted to receive a reduced end portion 68 of the probe shaft 34. The illustrated disc 64 actually has several such openings 66, any of which can be used to receive the end portion 68 of the shaft 34.

As shown, the shaft 58 and the disc 64 are axially alined with the opening 48 in the rubber diaphragm 44. Thus, the shaft 34 of the probe 30 must be swung into an angular position to be inserted into the opening 66. As the disc 64 is rotated, the probe 30 is oscillated around a circular path. The probe 30 is swung or wobbled rather than being rotated. The rotary disc 64 has a hub 70 which is tapered so as to afford clearance and guidance for the end portion 68 of the shaft 34.

The motive power for oscillating the probe 30 is provided by a motor 72 which is preferably of the electric speed-reduction type having built-in reduction gears to drive an output shaft 74 at a fairly slow speed. The motor 72 is suitably mounted on the cup-shaped member 60. Another cup-shaped member 76 is secured to the member 60 so as to form a complete enclosure for the motor 72.

A drive train is provided between the motor shaft 74 and the probe operating shaft 58. Such drive train preferably comprises a gear 78 or some other rotary drive member mounted on the motor shaft 74. Another gear or drive member 80 is mounted on the shaft 58. A driving connection between the gears 78 and 80 is provided by an intermediate drive member or gear 82 which meshes with the gears 78 and 80. The intermediate gear 82 is freely rotatable and is mounted on a movable carriage 84, preferably swingable about the axis of one of the gears 78 and 80. In this case, the carriage 84 is swingably mounted on the shaft 58 so that the pivot axis of the carriage coincides with the axis of the gear 80.

Initially, the carriage 84 occupies the position shown in FIG. 5. It is biased to this position by resilient or yieldable means illustrated as a spring 86 connected between the carriage 84 and an adjustable spring mounting bracket 88. Preferably, the initial force exerted by the spring 86 may be adjusted by means of a screw 89 or the like, mounted in a tapped aperture in the housing 16. The screw 89 is adapted to flex the spring bracket 88 so as to change the effective strength of the spring 86. Initially, the carriage 84 engages a portion 90 of the bracket 62, which acts as a stop.

When the material in the bin 14 is below the level of the probe, the motor 72 causes continuous oscillatory swinging movement of the probe about a circular path. When the material rises sufficiently to be engaged by the probe 30, the oscillation of the probe is impeded and usually is stopped. The resistance to the movement of the probe causes the motor 72 to develop additional torque which is transmitted by the gears 78, 82 and 80. This additional torque reacts on the intermediate gear 82 so as to cause the carriage 84 to swing counterclockwise against the resistance of the biasing spring 86. Such movement of the carriage 84 is illustrated in FIG. 6. The movement of the carriage is utilized to operate a control device illustrated as a switch 92. In this case, the switch 92 has a swingable operating arm 94 with a roller 96 mounted thereon to engage the carriage 84.

The switch 92 may be employed to perform various control functions. Thus, the switch 92 may be arranged to actuate an alarm, which may take the form of a warning light, a horn, or any other suitable device. The switch 92 may also be employed to shut off any conveyor or other device which may be employed to deliver the material to the bin. As another alternative, the switch 92 may be arranged to control a gate or other device to cause removal of the material from the bin.

When the material drops away from the probe 30, the torque on the gears 78, 82 and 80 is relieved so that the spring 86 is able to return the carriage 84 to its initial position. The switch 92 is thereby deactuated.

The motor 72 may be energized continuously if desired. For such service, it is preferred to employ a hysteresis synchronous motor. Alternatively, the motor 72 may be connected to the switch 92 so that the motor will be deenergized when the switch is actuated.

The carriage 84 is moved very quickly and positively by the excess torque transmitted by the intermediate gear 82 when the material impedes the movement of the probe. Thus, the indicator responds in a highly sensitive and reliable manner to the presence of the material at the level of the probe. The rubber diaphragm 44 provides for free and easy swinging movement of the probe 30 while sealing the housing of the indicator against any possible entry of the granular material from the bin. It will be evident that the bin level indicator is easy to manufacture and low in cost.

I claim:

1. A device for responding to the level of material in a bin or other receptacle,
    comprising a probe for engaging the material as it rises in the receptacle,
    means mounting said probe for predetermined movement relative to the material,
    a rotary motor having a stationary frame and a rotary shaft with a stationary axis of rotation,
    a first rotatable power transmitting drive means connected to said shaft of said motor for rotation by said motor,
    a second rotatable power transmitting drive means having a driving connection to said probe for imparting the predetermined movement to said probe,
    means supporting said second rotatable power transmitting drive means for rotation about a second stationary axis of rotation, an intermediate rotatable power transmitting drive means forming a rotary driving connection between said first and second rotatable power transmitting drive means to cause rotation thereof, a carriage supporting said intermediate rotatable power transmitting drive means, pivot means swingably mounting said carriage for swinging movement relative to said stationary motor frame, said intermediate power transmitting drive means thereby being swingable bodily with said carriage relative to said first and second rotatable power transmitting drive means, and a control device operable by swinging movement of said carriage caused by torque reaction on said intermediate rotatable power transmitting drive means when the movement of the probe is impeded by engagement of said probe with the material.

2. A device according to claim 1,
in which said pivot means for said swingable carriage is axially alined with one of said first and second rotatable power transmitting drive means.

3. A device according to claim 1,
in which said pivot means for said swingable carriage supports said carriage for swinging movement about an axis corresponding to the axis of said second rotatable power transmitting drive means.

4. A device according to claim 1,
including biasing means for resisting the swinging movement of said carriage relative to said stationary motor frame.

5. A device according to claim 1,
including adjustable resilient means for biasing said carriage to resist the swinging movement thereof relative to said stationary motor frame.

6. A device according to claim 1,
in which said control device comprises a control switch operable by said carriage upon said swinging movement thereof.

7. A device according to claim 1,
in which said first mentioned means includes a flexible diaphragm supporting said probe for oscillatory swinging movement,
said first mentioned driving connection including means for imparting oscillatory swinging movement to said probe in response to rotary movement of said second rotatable drive means.

8. A device for responding to the level of material in a bin or other receptacle,
comprising a probe for engaging the material as it rises in the receptacle, means mounting said probe for predetermined movement relative to the material, a rotary motor having a stationary frame and a rotary shaft, a first rotatable gear connected to said shaft of said motor for rotation by said motor, a second rotatable gear having a driving connection to said probe for imparting the predetermined movement of said probe, means supporting said second gear for rotation about a second stationary axis of rotation, an intermediate rotatable gear meshing with said first and second gears and forming a driving connection therebetween, a carriage supporting said intermediate rotatable gear, pivot means supporting said carriage for swinging movement relative to said stationary motor frame, said intermediate rotatable gear thereby being swingable bodily with said carriage relative to said first and second rotatable gears, and a control device operable by swinging movement of said carriage caused by torque reaction on said intermediate rotatable gear when the movement of the probe is impeded by engagement of said probe with the material.

9. A device according to claim 8,
in which said pivot means supports said carriage for swinging movement about an axis corresponding to the rotary axis of one of said first and second gears.

10. A device according to claim 8,
in which said pivot means supports said carriage for swinging movement about an axis corresponding to the rotary axis of said second gear.

* * * * *